US011162619B2

(12) United States Patent
Ahola et al.

(10) Patent No.: US 11,162,619 B2
(45) Date of Patent: Nov. 2, 2021

(54) DRILL ROD OR ADAPTOR WITH STRENGTHENED SPIGOT COUPLING

(71) Applicant: SANDVIK INTELLECTUAL PROPERTY AB, Sandviken (SE)

(72) Inventors: Petri Ahola, Gävle (SE); David Wickström, Sandviken (SE); Andreas Norman, Sandviken (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 247 days.

(21) Appl. No.: 15/576,113

(22) PCT Filed: May 19, 2016

(86) PCT No.: PCT/EP2016/061300
§ 371 (c)(1),
(2) Date: Nov. 21, 2017

(87) PCT Pub. No.: WO2016/188862
PCT Pub. Date: Dec. 1, 2016

(65) Prior Publication Data
US 2018/0135782 A1    May 17, 2018

(30) Foreign Application Priority Data
May 22, 2015   (EP) .................................... 15168921

(51) Int. Cl.
*F16L 15/06*   (2006.01)
*E21B 17/042*  (2006.01)
*E21B 1/00*    (2006.01)

(52) U.S. Cl.
CPC ............ *F16L 15/06* (2013.01); *E21B 17/042* (2013.01); *E21B 1/00* (2013.01)

(58) Field of Classification Search
CPC ........... F16L 15/06; E21B 17/042; E21B 1/00
See application file for complete search history.

(56) References Cited

U.S. PATENT DOCUMENTS

| 1,926,925 | A | 9/1933 | Wescott |
| 3,537,738 | A | 11/1970 | Fischer et al. |
| 4,548,431 | A | 10/1985 | Hall |
| 5,169,183 | A | 12/1992 | Hallez |
| H1329 | H * | 7/1994 | Bailey ........................... 285/333 |

(Continued)

FOREIGN PATENT DOCUMENTS

| CL | 2015632 | 3/2015 |
| EP | 0979922 | 2/2000 |

(Continued)

OTHER PUBLICATIONS

International Preliminary Report on Patentability for PCT/EP2016/061300 dated Nov. 28, 2017.*

*Primary Examiner* — David Bochna
*Assistant Examiner* — James A Linford
(74) *Attorney, Agent, or Firm* — Corinne R. Gorski

(57) ABSTRACT

An elongate component, such as a drill rod or adaptor, forms part of a drill string having a shoulder contact male spigot coupling. The male spigot includes a non-threaded shank and a threaded section in which an axial length of the non-threaded shank is provided at a predetermined minimum relative to an outside diameter of the spigot at the threaded section.

17 Claims, 5 Drawing Sheets

(56) References Cited

U.S. PATENT DOCUMENTS

| | | | |
|---|---|---|---|
| 6,164,392 A | 12/2000 | Larsson et al. | |
| 6,196,598 B1* | 3/2001 | Yao | E21B 17/0426 |
| | | | 285/333 |
| 2010/0018699 A1* | 1/2010 | Hall | E21B 17/042 |
| | | | 166/242.6 |
| 2016/0215572 A1* | 7/2016 | Jansson | E21B 17/042 |
| 2016/0222737 A1* | 8/2016 | Rosen | E21B 17/0426 |

FOREIGN PATENT DOCUMENTS

| | | |
|---|---|---|
| EP | 2845991 | 3/2015 |
| EP | 2845992 B1 | 1/2016 |
| RU | 2247219 C2 | 2/2005 |
| WO | 96/03605 | 2/1996 |

* cited by examiner

DRILL ROD OR ADAPTOR WITH STRENGTHENED SPIGOT COUPLING

RELATED APPLICATION DATA

This application is a § 371 National Stage Application of PCT International Application No. PCT/EP2016/061300 filed May 19, 2016 claiming priority to EP 15168921.3 filed May 22, 2015.

FIELD OF INVENTION

The present invention relates to a drill string component to form part of a drill string having a male spigot coupling end with a threaded section configured to minimise stress at the region of the threads and failure of the coupling.

BACKGROUND ART

Percussion drilling is used to create a long borehole via a plurality of elongate drill string rods coupled together end-to-end by interconnected male and female threaded ends. The well-established technique breaks rock by hammering impacts transferred from the rock drill bit, mounted at one end of the drill string, to the rock at the bottom of the borehole. Typically, the energy required to break the rock is generated by a hydraulically driven piston that contacts the end of the drill string (via a shank adaptor) to create a stress (or shock) wave that propagates through the drill string and ultimately to the base rock level. Conventional male and female threaded couplings are described in EP 2845993, EP 1259703, EP 1232321 and U.S. Pat. No. 4,968,068.

When the male and female threaded ends of neighbouring drill rods are coupled to create the drill string, the joint is typically subjected to bending forces during drilling. These bending moments fatigue the coupling and lead to breakage within the threaded portion of the joint. Typically, it is the threaded male spigot that is damaged and determines the operational lifetime of the coupling. In particular, stresses in the threaded section of the male spigot are typically considerable and it is common for the spigot to fail at the region of the threads. Additionally, stresses at the region of the threads occur also due to the transmission of the compressing shock wave. Accordingly, what is required is a strengthened male threaded coupling that addresses the above problems.

SUMMARY OF THE INVENTION

It is an objective of the present invention to provide a drill string component to form part of a drill string having a male end configured to withstand non-symmetrical loading forces acting on the drill string to reduce stress of the threaded section of the male end and minimise the risk of failure of the coupling. It is a further objective to provide a coupling that is resistant to bending waves in the drill string resultant for example from hole deviation or non-central strikes by the drive piston at the rearwardmost drill rod or shank adaptor. It is a further objective to provide a drilling component for shoulder contact coupling having a male threaded end that provides a secure coupling with a corresponding female threaded end of a neighbouring drill rod or other component of the drill string so as to form an integral and secure unit within the assembled drill string.

The objectives are achieved by providing a male coupling at a drill component with a shoulder contact region in which an axial length of a non-threaded shank part of the male spigot coupling has a predetermined minimum value relative to an external diameter of the male spigot at the threaded section.

According to a first aspect of the present invention there is provided an elongate component to form part of a drill string comprising: an elongate length section having a pair of axial ends; a male spigot provided at at least one of the ends and having an externally threaded section and a non-threaded shank positioned axially intermediate the threaded section and the length section; the male spigot projecting axially from an annular side surface of the length section or a radially outward extending shoulder, the threaded section having an outside diameter (Dy) corresponding to a crest of the thread and the non-threaded shank comprises an axial length (Ls) defined between an axially inner end of the threaded section and the side surface; characterised in that: the quotient Ls/Dy is equal to or greater than 0.4.

Within this specification the reference to Dy corresponds to the diametric distance between the radial positions at the crests (of the helical ridge) on diametrically opposite sides of the threaded section to represent a maximum diameter of the threaded section. Where the threaded section is generally conical, Dy corresponds to the diametric distance of the axially endmost crest having the largest radius/diameter.

Within this specification reference to Ds corresponds to a minimum (smallest) diameter of the non-threaded shank and Dm corresponds to a diameter of the main length section. Additionally, within this specification, reference to Di corresponds to the diametric distance between the radial positions at the roots (of the helical ridge) on diametrically opposite sides of the threaded section to represent a minimum diameter of the threaded section. Where the threaded section is generally conical, Di corresponds to the diametric distance of the axially endmost root having the largest radius/diameter.

Within the specification, reference to Ls corresponds to an axial length of the non-threaded shank defined between an axially inner end of the threaded section and the side surface of the shoulder or main length section and Lt corresponds to an axial length of the threaded section between the thread exit ends.

Optionally, the quotient Ls/Dy is in the range 0.4 to 1.0. Optionally the quotient Ls/Dy is in the range 0.45 to 1.0, 0.5 to 1.0, 0.55 to 1.0, 0.6 to 1.0, 0.65 to 1.0, 0.7 to 1.0, 0.75 to 1.0; 0.8 to 1.0 or 0.85 to 1.0. Preferably, the quotient Ls/Dy is in the range 0.4 to 0.8 or 0.5 to 0.8. Optionally, the quotient Ls/Dy may be equal to or greater than 0.45, 0.5, 0.6 or 0.7. Axially separating the helical threads from the shoulder contact region of the drill string component via this minimum axial length of the non-threaded shank minimises the magnitude of the bending forces transmitted through the helical thread resultant from lateral deviations in the position of the drill bit during drilling or potentially imperfect hammer strikes. Accordingly, the lifetime of the drill component is enhanced over conventional male couplings in addition to reducing the risk of down-the-hole coupling failures.

Preferably, the spigot comprises an axial length (L) defined between an axial endmost surface of the spigot and the side surface of the length section or shoulder, wherein the quotient Ls/L is equal to or greater than 0.25. More preferably, the quotient Ls/L is the range 0.25 to 0.5; 0.3 to 0.5; 0.35 to 0.5; 0.4 to 0.5; 0.45 to 0.5. By maximising the axial length of the non-threaded shank relative to the total axial length of the spigot, the threaded section is axially separated from the shoulder contact region of the component and hence is configured to better withstand bending moments and accordingly to reduce stress concentrations at the helical thread. Within this specification, the axially inner end of the threaded section is defined as the axial position at which a radial position of the crest or a root of the thread corresponds to the radial position of an external surface of the non-threaded shank.

Optionally, and to further enhanced the resistance to stress resultant from bending forces, the shank comprises a transitional region positioned adjacent the annular side surface wherein a cross sectional profile at the transition region in a plane extending in a longitudinal axis of the component is curved such that a cross sectional area of the shank increases axially towards the annular side surface. More preferably, the curvature of the transition region axially closest to the side surface comprises a first radius of curvature that is less than a second radius of curvature of the outer surface at the transition region axially closest the threaded section, the outside diameter of the transition region over the first and second radii of curvature increasing in a direction from the threaded section to the side surface. Accordingly, the axial junction between the shoulder region of the component and the spigot (and in particular the non-threaded shank) is reinforced against bending moments to reduce stress concentration and the risk of failure of the coupling under load. Reference to 'curvature' encompasses a smooth or gradual change in the surface profile and also a plurality of sequential linear increases in the diameter from the non-threaded shank to the shoulder that collectively may be regarded as a 'curved' shape profile.

Optionally, the drill string component comprises a shoulder projecting radially from a main length or general length section of the component such that outside diameter of the shoulder is greater than an outside diameter of the length section and/or the male spigot. Optionally, the shoulder and in particular the annular side surface may be formed by an axial end of the length section of the component or the axial side of the radially extending shoulder. Such a configuration provides shoulder contact coupling between the male spigot and a corresponding female sleeve. Optionally, a cross sectional profile of the outer surface of the transition region between the non-threaded shank and the annular end surface in a plane of the longitudinal axis of the component comprises a segment of an ellipse. Optionally, the segment is substantially one quarter of a perimeter of an ellipse.

Within this specification reference to Ds corresponds to a minimum (smallest) diameter of the non-threaded shank and Dm corresponds to a diameter of the main length section.

Preferably, Ls is less than an axial length Lt of the threaded section. Optionally, the diameter (Ds) of the non-threaded shank is approximately equal to or less than a diameter of (Dm) of the main length section. Optionally, Ds may be approximately equal to Dy.

Preferably, Ds is less than Dy. Preferably, Ds is less than a diametric distance (Di) between the radial positions of the roots (between the helical ridges) on diametrically opposed sides of the threaded section. More preferably, Ds may be in the range (Di minus Td) to (Di minus 4Td), where Td is the thread depth perpendicular to the longitudinal axis between the radial positions of a crest and a root. More preferably, Ds is in the range (Di minus Td) to (Di minus 3Td). Most preferably, Ds is equal to Di minus 2Td. The spigot, comprising a Ds configuration as detailed herein, is advantageous to allow optimisation of the transition region adjacent to the annular side surface of the shoulder or end of the main length section. In particular, a Ds that is less than Di enables an axially longer transition region and a greater radii of curvature at the transition between the non-threaded shank and the annular side surface (of the shoulder or main length section). Accordingly, the present configuration of Ds minimises stress concentrations at the base of the spigot (at its junction with the main length or shoulder section). The present configuration of Ds in combination with Ls is accordingly advantageous to provide a percussion component that is resistant to bending stresses and also configured to withstand the stresses resultant from transmission of the percussive shock wave through the spigot both when the components of the drill string are perfectly aligned axially and also when deflected (being aligned slightly transverse to one another) in use.

Preferably, the curvature of the transition region axially closest to the side surface comprises at least three or four radii of curvature. Optionally, the curvature of the transition region comprises three to six or three to four radii of curvature. Preferably, the radii at the transition region increase in an axial direction from the side surface (of the shoulder or main length) towards a minimum diameter (Ds) of the non-threaded shank. Preferably, the transition region comprises three or four different radii of curvature. Optionally, a first radius of curvature R1 is approximately half a second radius of curvature R1≈R2/2; optionally R2 is approximately half a third radius of curvature R2≈R3/2; optionally, R3 is approximately a third of a fourth radius of curvature R3≈R4/3 respectively at the transition region where R1 is positioned closest to the side surface and R4 is located at and defines the minimum diameter Ds of the non-threaded shank.

The subject invention is configured specifically as a threaded spigot for a percussion drill component. The elongate component and in particular the male spigot via a configuration of the threads and the non-threaded shank (as detailed herein) is adapted to withstand bending forces and stress concentrations resultant from transmission of the percussive shock whilst minimising any reduction in the magnitude of the shock wave during transmission. The thread profile of the spigot is adapted for percussion drilling and preferably the threads comprise a uniform diameter along the axial length of the threaded section Lt. That is, the threaded section is formed preferably as a generally cylindrical section. As such the thread profile is appreciably robust to withstand the shock wave transmission and hence high loading forces. In particular, the subject invention comprises a thread having a pitch length in the range 5 to 50 mm for drill components with increasing respective outside diameters. Additionally, a pitch angle of the thread of the subject invention may be in a range 5 to 10° for a component with a respective pitch length and outside diameter, where the pitch angle is the angle θ extending between the path of the helical thread path and the tangent perpendicular to the longitudinal axis of the elongate component. Additionally, the diameter Dy of the threaded section (the thread crest-to-crest distance) according to aspects of the present invention may be in a range 15 to 120 mm for respective pitch lengths and pitch angles. Accordingly, the subject invention may comprise a thread configuration in which the quotient of pitch length/thread diameter is in a range 0.3 to 0.6; 0.35 to 0.55 and optionally 0.4 to 0.46.

According to a second aspect of the present invention there is provided a percussion drill string comprising: a component as claimed herein; a plurality of drill rods and a drill bit provided at one axial end of the drill string.

Optionally, the percussion drill string component may comprise anyone of the following: a drill rod; a drill tube; a shank adaptor; a drill bit.

BRIEF DESCRIPTION OF DRAWINGS

A specific implementation of the present invention will now be described, by way of example only, and with reference to the accompanying drawings in which.

DETAILED DESCRIPTION OF PREFERRED EMBODIMENT OF THE INVENTION

The subject invention will be described by way of example with reference to a shank adaptor being a drill string component to form part of a drill string. It will be appreciated that the subject invention is applicable to any elongate component having a shoulder contact male spigot end adapted to form a coupling joint with a threaded female sleeve of an adjacent component of the drill string. Accordingly, the subject invention may be applied to a drill rod, drill tubing, a shank, a shank adaptor, a drill bit, a shaft or adaptor mounted at the driving end of the drill string or at the bit end of the drill string.

Figure 1:
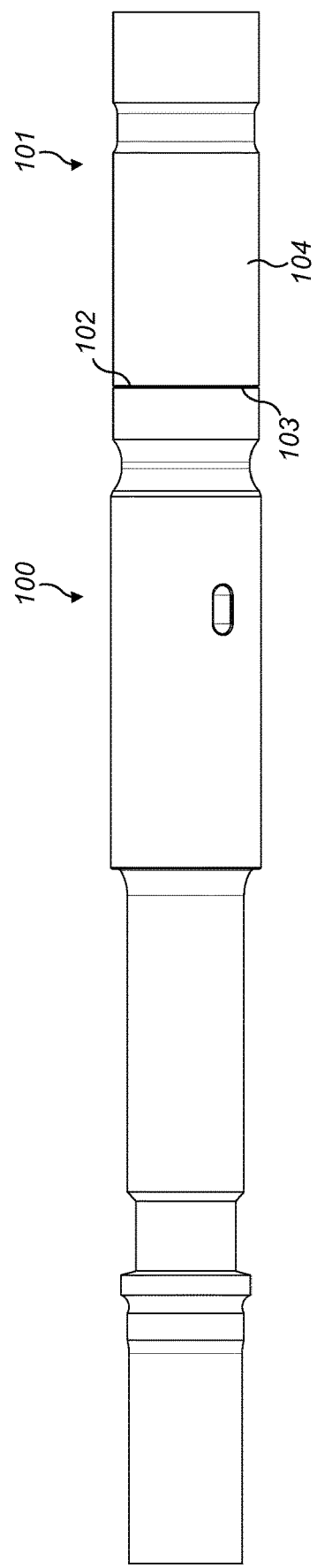
FIG. 1 is an external perspective view of part of a drill string comprising a shank adaptor coupled axially via one end to a drill rod via a male and female coupling joint.

Referring to FIG. 1, a drill string comprises an elongate shank adaptor 100 coupled axially to an endmost drill rod 101 via a threaded coupling 104 formed by a male threaded end of the shank adaptor 100 and a female threaded end of the drill rod 101. Both drill string components 100, 101 are coupled via 'shoulder contact' in which an annular side surface 102 of the male coupling of adaptor 100 is engaged in touching contact with a corresponding annular side surface 103 of the female sleeve of the drill rod 101.

Figure 2:
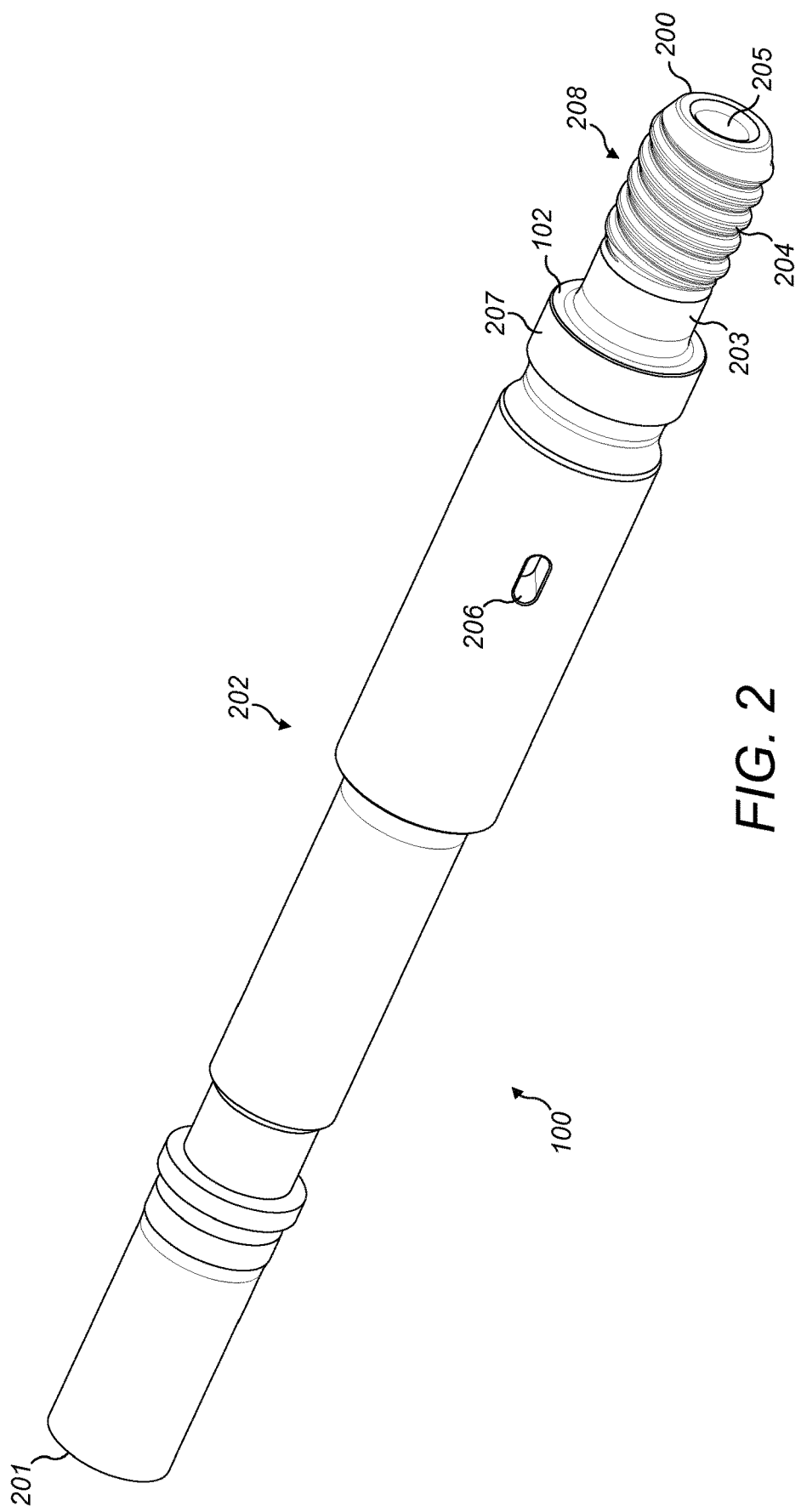
FIG. 2 is a perspective view of the shank adaptor of FIG. 1 according to a specific implementation of the present invention.

Referring to FIG. 2, the shank adaptor 100 comprises a main length section 202 having a first end 200 and a second end 201 and is configured for mounting at the driving end of the drill string adjacent the percussive hammer via second end 201. A flushing hole 206 is formed within main length section 202 to allow the introduction of a flushing fluid into a central bore 205 extending axially through the axially forward length part of adaptor 100 between flushing hole 206 and first end 200. Main length section 202 is terminated towards first end 200 by an annular shoulder 207 that projects radially from a male spigot 208 comprising an external diameter being less than a corresponding external diameter of shoulder 207 and main length section 202. Accordingly, the annular side surface 102 is provided at the axial junction between spigot 208 and shoulder 207 to provide the shoulder contact surface for abutment against the annular side surface 103 of the threaded female coupling. Spigot 208 is divided axially into a threaded section 204 extending axially towards first end 200 and a non-threaded shank 203 positioned axially intermediate threaded section 204 and shoulder 207.

Figure 3:
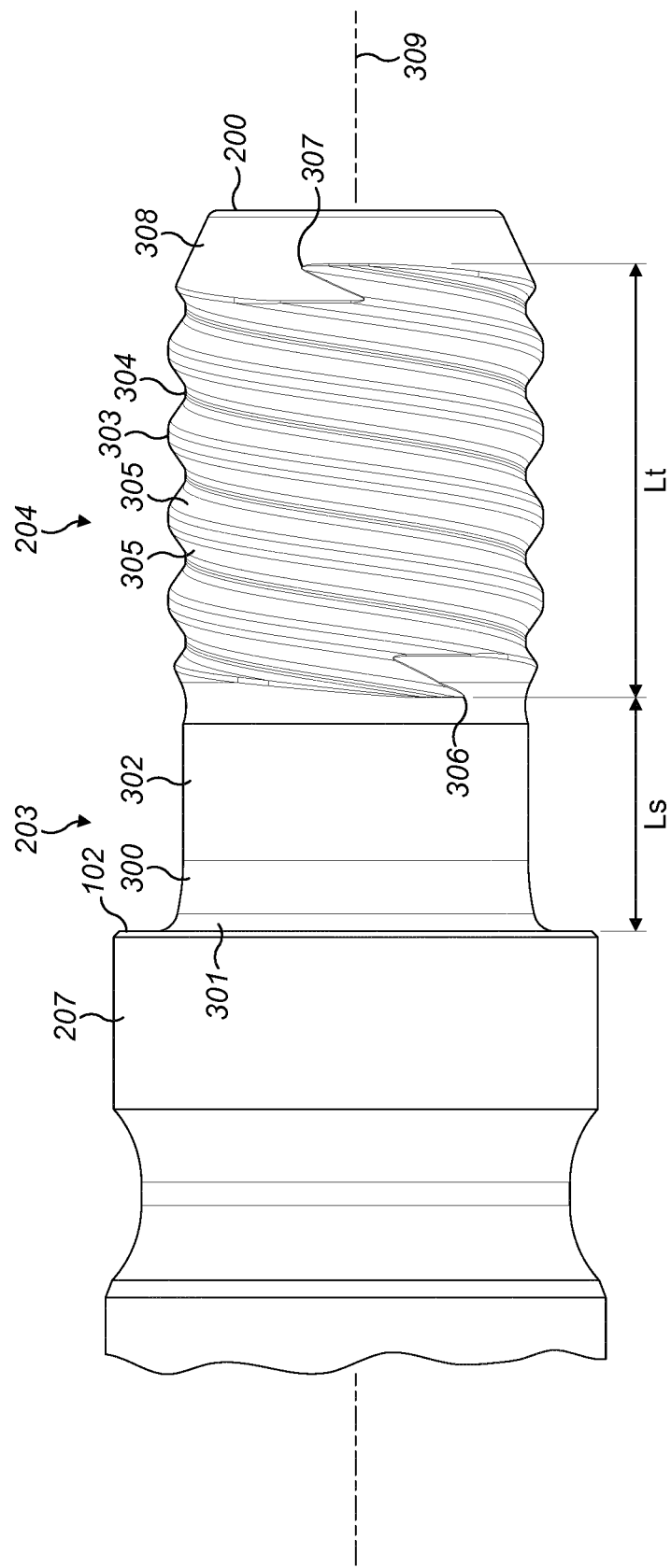
FIG. 3 is an external perspective view of the male spigot coupling end of the shank adaptor of FIG. 2.
Figure 4:
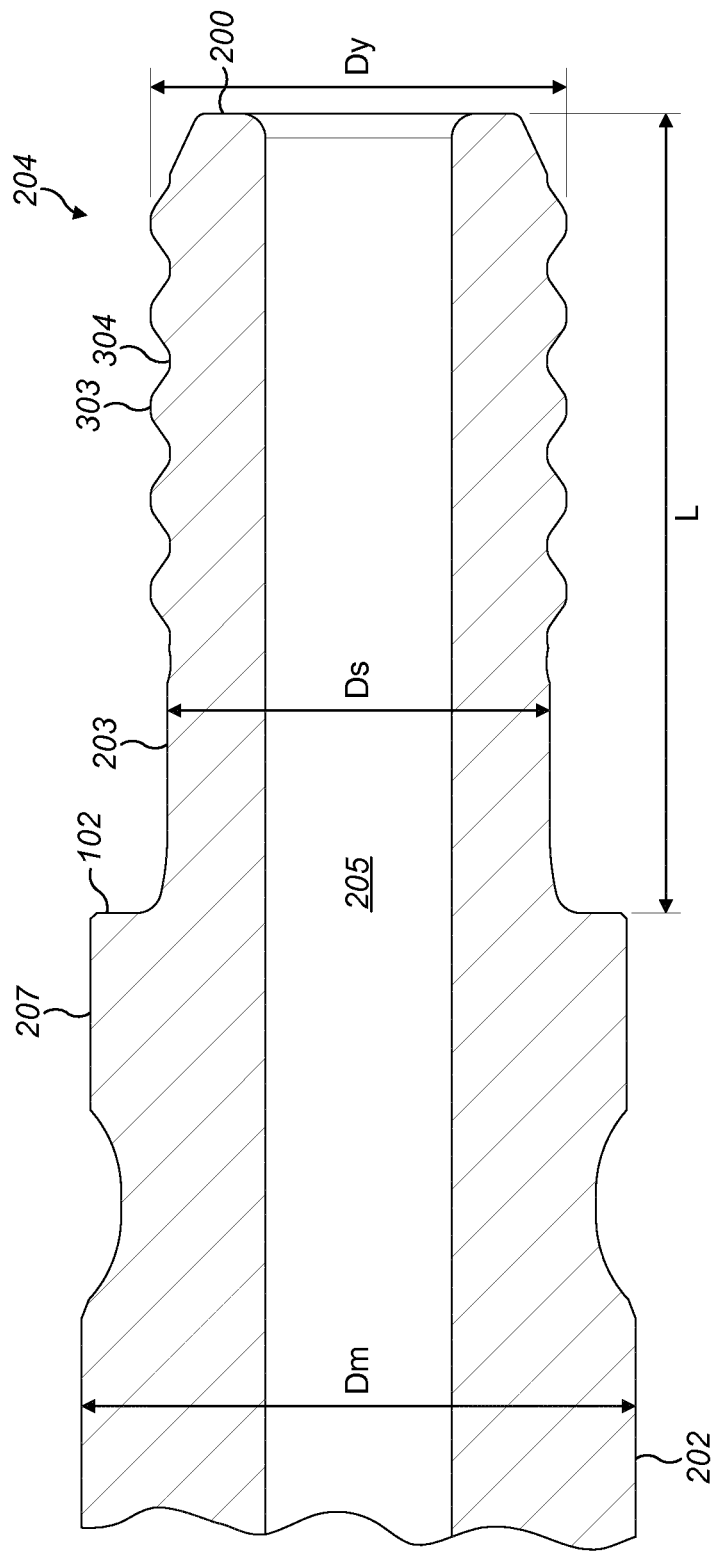
FIG. 4 is a cross sectional view of the male spigot end of FIG. 3.

Referring to FIGS. 3 and 4, the non-threaded shank 203 comprises a generally cylindrical region 302 positioned axially closest to threaded section 204 and a transition region that forms an axial junction with the annular side surface 102 of shoulder 207. An external diameter of the non-threaded shank 203 at the transition region increases from the cylindrical region 302 to a first curved region 300 having a first radius of curvature and a second curved region 301 having a second radius of curvature being less than the first radius of curvature of region 300. According to the specific implementation, in a plane extending longitudinally along spigot 208, a curvature of the non-threaded shank at the transition region 300, 301 comprises an elliptical shape profile. This curvature, at the transition region 300, 301 between non-threaded shank 203 and shoulder 207 is advantageous to strengthen the spigot 208 against bending forces encountered by the drill string during drilling.

Threaded section 204 according to the specific implementation comprises a single-start thread-form having a single ridge formed by helical turns extending axially between a first thread end 307 (positioned towards adaptor first end 200) and a second thread end 306 terminating at the non-threaded shank 203. A helically wound ridge accordingly comprises helical turns having a crests 303 and axially intermediate roots 304. The roots 304 and crest 303 are separated by flanks 305 being curved and extending generally transverse to a longitudinal axis 309 extending through shank adaptor 101. A depth of the thread at first end 307 diminishes along the circumferential path of crest 303 for a portion of an endmost helical turn axially closest to adaptor first end 200. Accordingly, thread first end 307 terminates as a smooth radial transition into a generally conical end region 307 of spigot 208 that is in turn terminated by an annular end surface at adaptor first end 200. Similarly, thread second end 306 is formed as a gradual radial transition into the non-threaded shank region 302. That is, the thread depth within the endmost helical turn at both thread end 306, 307 diminishes as the external diameter of the crest 303 within the final axial portion of each endmost helical turn decreases towards the external diameter of the non-threaded shank 203 and conical end section 308, respectively. The gradual reduction in the external diameter of the crest 303 at the thread ends 307, 306 is advantageous to reduce stress concentrations at the threaded section 204 so as to contribute to the increased strength of the present male spigot end 208.

The non-threaded shank 203 comprises an axial length Ls defined as the axial distance between annular side surface 102 and the axially innermost second end 306 of threaded section 204. The thread second end 306 is defined as the axial region at which the crest 303 diminishes to an external diameter of the non-threaded shank 203. This axial position is accordingly defined as the region where a cross sectional shape profile of the male spigot 208 is circular corresponding to the cylindrical non-threaded shank 203 in contrast to the non-circular cross sectional shape profile of the threaded section 204. Similarly, an axial length Lt of the threaded section 204 is defined as the axial distance between the thread first and second ends 307, 306. The thread first end 307 is defined as the axial position where the cross sectional shape profile of the conical section 308 becomes circular.

Male spigot 208 also comprises a main axial length L defined as the axial distance between annular side surface 102 and adaptor first end 200. According to the specific implementation, an external diameter Ds of the non-threaded shank at the cylindrical region 302 is less than the corresponding external diameter Dm of the main length section 202 and a corresponding external diameter at the annular shoulder 207. The diameter Ds is also less than an external diameter Dy of the threaded section 204 corresponding to the radial position of the peak of crest 303 at each helical turn. According to the specific implementation, Dy is uniform over the axial length Lt of threaded section 204 such that the threaded is provided on a generally cylindrical spigot 208. However, as will be appreciated, the subject invention is equally suitable for conical spigots 208 having in particular a conical threaded section 204.

To optimise the strength of the spigot 208 for resistance to bending forces encountered by the drill string during percussive drilling, the quotient Ls/Dy is in a range 0.4 to 1.0 and according to the specific implementation is 0.5 to 0.7. Additionally, this strengthening of the spigot 208 may be expressed as the quotient Ls/L being in the range 0.25 to 0.5 and in particular 0.28 to 0.32. Accordingly, Lt is greater than Ls. Enhancing the axial length Ls of the non-threaded shank 103 is advantageous to separate axially the threaded section 204 from annular side surface 102 that has been found through simulation investigations to minimise the stress at the helical turns and in particular the crests 303, roots 304 and flanks 305 for shoulder contact threaded couplings. Accordingly, the risk of failure of the coupling joint is minimised and the operational lifetime of the drill string components enhanced.

Figure 5:
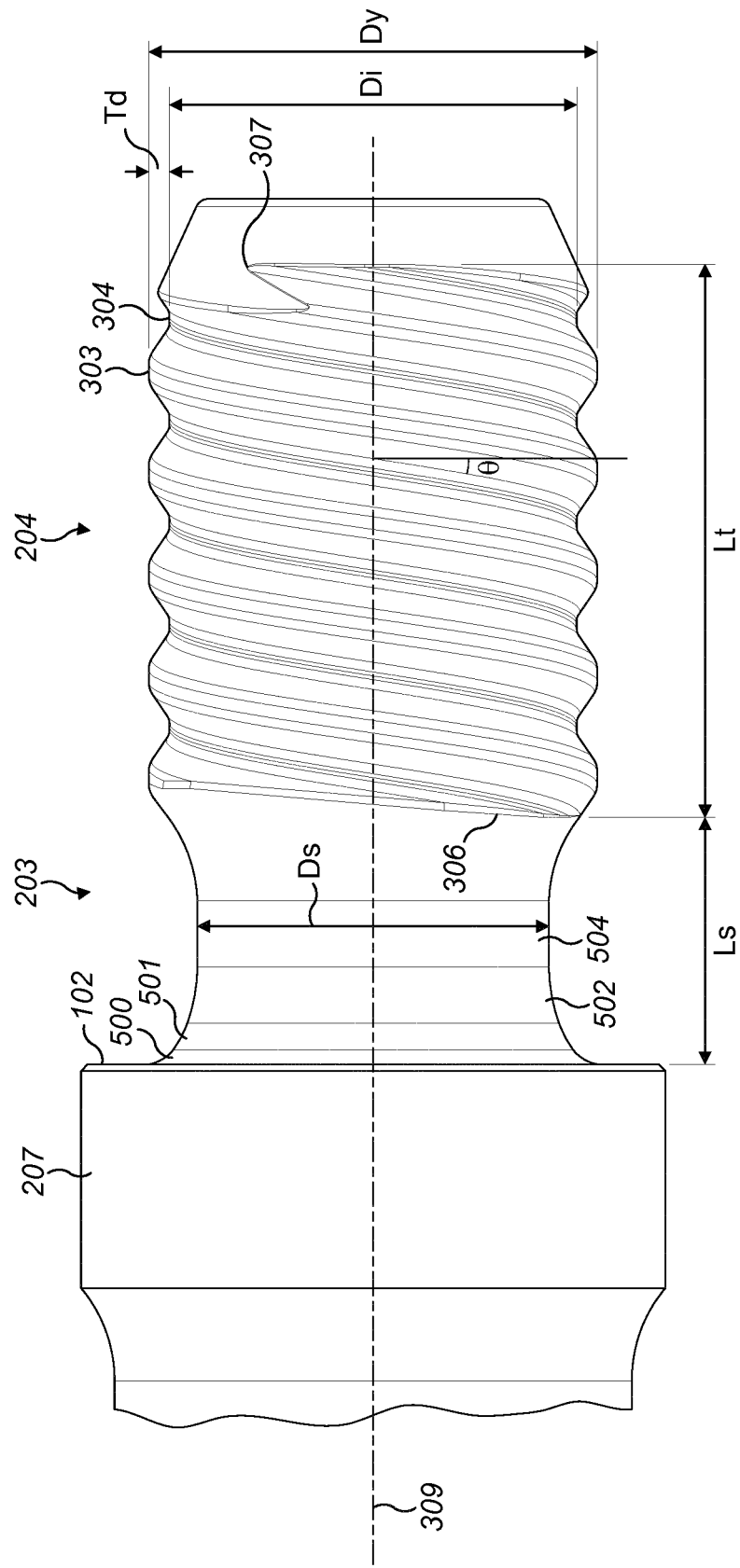
FIG. 5 is an external perspective view of the male spigot coupling end of the shank adaptor of FIG. 2 according to a further specific implementation of the present invention.

A further specific implementation of the male spigot 208 is detailed with reference to FIG. 5. FIG. 5 differs from the embodiment shown and described with reference to FIGS. 2 to 4 in that the non-threaded shank 203 comprises a continuously curved shape profile in the axial direction between side face 102 and the thread end 306. However, the configuration of the threaded section 204 described below according to the embodiment of FIG. 5 is applicable also to the embodiment of FIGS. 2 to 4.

Threaded section 204 is formed as a generally cylindrical end section at spigot 208 such that the diameter Dy of the thread between crest 303 is generally uniform along the axial length of threaded section 204. Additionally, a diameter Di (corresponding to the diametric distance between the radial positions of the roots 304) is also substantially uniform along the full axial length of the threaded section 204 between thread ends 306, 307. The subject invention is specifically adapted for percussion (or hammer) components forming part of a drilling apparatus and in particular a drill string by virtue of the configuration of the thread at the spigot 208. In particular, a pitch length of the thread may be in the range 5 to 50 mm depending upon the size (i.e., radius) of the elongate component. To optimise the thread for percussion drilling, a pitch angle θ may be in the range 5 to 10° for respective sizes of component. Such a configuration is to be contrasted with component threaded ends for rotary or exploration that may typically comprise API type threads having a much reduced pitch angle being of the order of 1°. In some implementations, an average thread diameter (crest-to-crest distance) may be in the range 15 to 120 mm being dependent upon the size (i.e., radius) of the elongate component.

Accordingly, the thread at the male spigot preferably comprises a quotient of pitch (crest to crest axial distance)/average thread diameter of 0.35 to 0.55 where the average thread diameter is the average of diameter of the male and female threaded ends.

The present male spigot is also configured to minimise stress concentrations at transition region 300, 301, 500, 501 and 502 by virtue of the relative dimensions of Ds, Di and Td where Di corresponds to the diametric distance between the radial positions of the roots 304 (between each helical ridge) on diametrically opposite sides of the threaded section, and Td corresponds to a depth of the thread between crests 303 and roots 304 (in a plane perpendicular to longitudinal axis 309). In particular, the stress concentrations at transition region 300, 301, 500, 501 and 502 are minimised as far as possible where Ds is less than Dy and Ds is less than Di. In particular, a maximum diameter Ds may be equal to Di−Td and a minimum diameter Ds may be equal to Di−4Td. Preferably, Ds is approximately equal to Di−2Td.

The relative dimensions of Ds and Ls as described herein maximise the axial and radial distances over which the transition region 300, 301, 500, 501, 502 may extend. In particular, and according to the configuration of FIG. 5, the non-threaded shank 203 comprises a transition region having a first radius of curvature R1 at section 500 that is less than a second axially adjacent radius of curvature R2 at section 501 that is in turn less than an axially adjacent third radius of curvature R3 at section 502 that is in turn less than an axially adjacent fourth radius of curvature R4 at section 504. In particular, the radius R1 at section 500 is approximately equal to half the radius R2 at section 501; the radius R2 at section 501 is approximately half the radius R3 at section 502 and the radius R3 at section 502 is approximately one third of the radius R4 at section 504. As illustrated in FIG. 5, section 500 is positioned axially closest to side surface 102, section 501 is positioned second closest to side surface 102, section 502 is positioned third closest to side surface 102 and section 504 is positioned furthest from side surface 102. A minimised Ds and a maximised Ls accordingly enable a smooth transition between the non-threaded shank 203 and the shoulder 207. As such, spigot 208 is strengthened against bending induced stress and the stresses resultant from transmission of the percussive shock wave.

The invention claimed is:

1. An elongate percussion drill component arranged to form part of a drill string, the component comprising: an elongate length section having a pair of axial ends; and a male spigot provided at at least one of the ends and having an externally threaded section having a thread and a non-threaded shank positioned axially intermediate the threaded section, the male spigot projecting axially from an annular side surface of the length section at a radially outward extending shoulder of the length section, the threaded section having an outside diameter Dy corresponding to a crest of the thread and a minimum diameter corresponding to a diametric distance Di between the radial positions of roots of the thread on diametrically opposed sides of the threaded section, the thread including an axially inner end terminating at the non-threaded shank, the non-threaded shank having a minimum external diameter Ds and an axial length Ls defined between the axially inner end of the thread of the threaded section and the side surface, wherein the minimum external diameter Ds of the non-threaded shank is less than both the outside diameter Dy and diametric distance Di of the threaded section, wherein the quotient Ls/Dy is equal to or greater than 0.4, wherein the non-threaded shank comprises a transition region positioned adjacent the annular side surface, a cross sectional profile at the transition region in a plane extending in a longitudinal axis of the component being curved such that a cross sectional area of the shank increases axially towards the annular side surface and encompasses a smooth or gradual change in the cross-sectional profile, wherein axially inner end of the thread is formed as a gradual radial transition into the non-threaded shank, wherein the spigot has an axial length L defined between an axial endmost surface of the spigot and the side surface of the length section or shoulder, wherein the quotient Ls/L is equal to or greater than 0.25, wherein Ds is in the range Di minus Td to Di minus 4Td, where Td is a depth of the thread between the radial positions of the crest and the root perpendicular to a longitudinal axis of the component, and wherein the curvature of the transition region includes at least four radii of curvature, a first radius of curvature being less than a second radius of curvature that is less than a third radius of curvature that is less than a fourth radius of curvature of the outer surface at the transition region, the outside diameter at the transition region over the first, second, third and fourth radii of curvature increasing in a direction from the threaded section to the side surface.

2. The component as claimed in claim 1, wherein the quotient Ls/Dy is in the range 0.4 to 1.0.

3. The component as claimed in claim 1, wherein the quotient Ls/Dy is in the range 0.5 to 1.0.

4. The component as claimed in claim 1, wherein the quotient Ls/Dy is in the range 0.6 to 1.0.

5. The component as claimed in claim 1, wherein the quotient Ls/L is the range 0.25 to 0.5.

6. The component as claimed in claim 5, wherein the quotient Ls/L is equal to or greater than 0.3.

7. The component as claimed in claim 6, wherein the quotient Ls/L is not more than 0.5.

8. The component as claimed in claim 5, wherein the quotient Ls/L is equal to or greater than 0.4.

9. The component as claimed in claim 1, wherein Dy corresponds to a diametric distance between radial positions at the crest on diametrically opposite sides of the threaded section to represent a maximum diameter of the threaded section.

10. The component as claimed in claim 1, wherein the axially inner end of the threaded section is defined as the axial position at which a radial position of the crest or a root of the thread corresponds to the radial position of an external surface of the non-threaded shank.

11. The component as claimed in claim 1, wherein Ds is in the range Di minus Td to Di minus 3Td.

12. The component as claimed in claim 1, wherein Ds is approximately equal to Di minus 2Td.

13. The component as claimed in claim 1, wherein the curvature of the transition region axially closest to the side surface includes a first radius of curvature that is less than a second radius of curvature of the outer surface at the transition region axially closest to the threaded section, the outside diameter of the transition region over the first and second radii of curvature increasing in a direction from the threaded section to the side surface.

14. The component as claimed in claim 1, wherein a thread depth within an endmost helical turn at the axially inner thread end diminishes as the outside diameter Dy of the thread crest within a final axial portion of each endmost helical turn decreases towards the minimum external diameter Ds of the non-threaded shank.

15. A percussion drill string comprising the elongated percussion drill component as claimed in claim 1.

16. The percussion drill string as claimed in claim 15, wherein the component is any one of the following: a drill rod; a drill tube; a shank adaptor; and a drill bit.

17. The component as claimed in claim 16, wherein in the plane extending in the longitudinal axis from a curvature of the non-threaded shank at the transition region to the axially inner end of the thread formed as the gradual radial transition into the non-threaded shank comprises an elliptical shape profile.

* * * * *